(12) United States Patent
Pedlow, Jr. et al.

(10) Patent No.: US 7,620,180 B2
(45) Date of Patent: Nov. 17, 2009

(54) PREPARATION OF CONTENT FOR MULTIPLE CONDITIONAL ACCESS METHODS IN VIDEO ON DEMAND

(75) Inventors: Leo M. Pedlow, Jr., Ramona, CA (US); Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 973 days.

(21) Appl. No.: 10/802,008

(22) Filed: Mar. 16, 2004

(65) Prior Publication Data

US 2005/0094809 A1  May 5, 2005

Related U.S. Application Data

(60) Provisional application No. 60/516,867, filed on Nov. 3, 2003.

(51) Int. Cl.
*H04N 7/167* (2006.01)
*H04N 7/173* (2006.01)
*H04L 9/08* (2006.01)
(52) U.S. Cl. .................. 380/211; 380/210; 725/88
(58) Field of Classification Search .......... 380/210, 380/211; 725/88
See application file for complete search history.

(56) References Cited

U.S. PATENT DOCUMENTS 3,852,519 A  12/1974  Court
4,381,519 A  4/1983  Wilkinson et al.

(Continued)

FOREIGN PATENT DOCUMENTS

CA  2389247  5/2001

(Continued)

OTHER PUBLICATIONS van Gassel, J.P.; Kelly, D.P.; Eerenberg, O.; de With, P.H.N., "MPEG-2 compliant trick play over a digital interface," Consumer Electronics, 2002. ICCE. 2002 Digest of Technical Papers. International Conference on , vol., No., pp. 170-171, Aug. 7, 2002.*

(Continued)

*Primary Examiner*—Matthew T Henning
(74) *Attorney, Agent, or Firm*—Miller Patent Services; Jerry A. Miller

(57) ABSTRACT

A method of processing content in a video on demand (VOD) system consistent with certain embodiments of the invention, wherein the content is identified by a first set of packet identifiers (PIDs), involves receiving content, the content having marked packets designating packets that are to be encrypted by a first encryption system by setting an encryption flag for all packets designated to be encrypted. Packets are selected in the content according to a selective encryption selection criterion to produce selected packets. The selected packets are duplicated to produce duplicate copies of the selected packets and these duplicate copies are identified using a second set of PIDs. The duplicate copies identified by the second set of PIDs are inserted into the content. All encryption flags in the content are cleared except for the selected packets having the first set of PIDs, so the encryption to follow is selective. This abstract is not to be considered limiting, since other embodiments may deviate from the features described in this abstract.

32 Claims, 9 Drawing Sheets

U.S. PATENT DOCUMENTS

| | | |
|---|---|---|
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,515,107 A | 5/1996 | Chiang et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,835,668 A * | 11/1998 | Yanagihara .................. 386/95 |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,892,900 A | 4/1999 | Ginter et al. |
| 5,894,320 A | 4/1999 | Vancelette |
| 5,894,516 A | 4/1999 | Brandenburg |
| 5,905,732 A * | 5/1999 | Fimoff et al. ............... 370/516 |
| 5,915,018 A | 6/1999 | Aucsmith |
| 5,917,830 A | 6/1999 | Chen et al. |
| 5,920,626 A | 7/1999 | Durden et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |

| | | | | | | |
|---|---|---|---|---|---|---|
| 5,940,738 | A | 8/1999 | Rao | 6,292,892 | B1 | 9/2001 | Davis |
| 5,943,605 | A | 8/1999 | Koepele, Jr. | 6,307,939 | B1 | 10/2001 | Vigarie |
| 5,949,877 | A | 9/1999 | Traw et al. | 6,311,012 | B1 | 10/2001 | Cho et al. |
| 5,949,881 | A | 9/1999 | Davis | 6,314,111 | B1 | 11/2001 | Nandikonda et al. |
| 5,963,909 | A | 10/1999 | Warren et al. | 6,324,288 | B1 | 11/2001 | Hoffman |
| 5,973,679 | A | 10/1999 | Abbott et al. | 6,327,421 | B1 | 12/2001 | Tiwari et al. |
| 5,973,722 | A | 10/1999 | Wakai et al. | 6,351,538 | B1 | 2/2002 | Uz |
| 5,973,726 | A | 10/1999 | Iijima et al. | 6,351,813 | B1 | 2/2002 | Mooney et al. |
| 5,999,622 | A | 12/1999 | Yasukawa et al. | 6,377,589 | B1 | 4/2002 | Knight et al. |
| 5,999,698 | A | 12/1999 | Nakai et al. | 6,378,130 | B1 | 4/2002 | Adams |
| 6,005,561 | A | 12/1999 | Hawkins et al. | 6,389,533 | B1 | 5/2002 | Davis et al. |
| 6,005,940 | A | 12/1999 | Kulinets | 6,389,537 | B1 | 5/2002 | Davis et al. |
| 6,011,849 | A | 1/2000 | Orrin | 6,415,031 | B1 | 7/2002 | Colligan et al. |
| 6,012,144 | A | 1/2000 | Pickett | 6,415,101 | B1 | 7/2002 | deCarmo et al. |
| 6,016,348 | A | 1/2000 | Blatter et al. | 6,418,169 | B1 | 7/2002 | Datari |
| 6,021,199 | A | 2/2000 | Ishibashi | 6,424,717 | B1 | 7/2002 | Pinder et al. |
| 6,021,201 | A | 2/2000 | Bakhle et al. | 6,430,361 | B2 | 8/2002 | Lee |
| 6,026,164 | A | 2/2000 | Sakamoto et al. | 6,445,738 | B1 | 9/2002 | Zdepski et al. |
| 6,028,932 | A | 2/2000 | Park | 6,449,718 | B1 | 9/2002 | Rucklidge et al. |
| 6,049,613 | A | 4/2000 | Jakobsson | 6,452,923 | B1 | 9/2002 | Gerszberg et al. |
| 6,055,314 | A | 4/2000 | Spies et al. | 6,453,115 | B1 | 9/2002 | Boyle |
| 6,055,315 | A | 4/2000 | Doyle et al. | 6,453,116 | B1 | 9/2002 | Ando et al. |
| 6,057,872 | A | 5/2000 | Candelore | 6,456,985 | B1 | 9/2002 | Ohtsuka |
| 6,058,186 | A | 5/2000 | Enari | 6,459,427 | B1 | 10/2002 | Mao et al. |
| 6,058,192 | A | 5/2000 | Guralnick et al. | 6,463,152 | B1 | 10/2002 | Takahashi |
| 6,061,451 | A | 5/2000 | Muratani et al. | 6,466,671 | B1 | 10/2002 | Maillard et al. |
| 6,064,676 | A * | 5/2000 | Slattery et al. ............. 370/412 | 6,473,459 | B1 | 10/2002 | Sugano et al. |
| 6,064,748 | A | 5/2000 | Hogan | 6,480,551 | B1 | 11/2002 | Ohishi et al. |
| 6,065,050 | A | 5/2000 | DeMoney | 6,490,728 | B1 | 12/2002 | Kitazato et al. |
| 6,069,647 | A | 5/2000 | Sullivan et al. | 6,505,032 | B1 | 1/2003 | McCorkle et al. |
| 6,070,245 | A | 5/2000 | Murphy, Jr. et al. | 6,505,299 | B1 | 1/2003 | Zeng et al. |
| 6,072,872 | A | 6/2000 | Chang et al. | 6,510,554 | B1 | 1/2003 | Gordon et al. |
| 6,072,873 | A | 6/2000 | Bewick | 6,519,693 | B1 | 2/2003 | Debey |
| 6,073,122 | A | 6/2000 | Wool | 6,526,144 | B2 | 2/2003 | Markandey et al. |
| 6,088,450 | A | 7/2000 | Davis et al. | 6,529,526 | B1 | 3/2003 | Schneidewend |
| 6,105,134 | A | 8/2000 | Pinder et al. | 6,543,053 | B1 | 4/2003 | Li et al. |
| 6,108,422 | A | 8/2000 | Newby et al. | 6,549,229 | B1 | 4/2003 | Kirby et al. |
| 6,115,821 | A | 9/2000 | Newby et al. | 6,550,008 | B1 | 4/2003 | Zhang et al. |
| 6,118,873 | A | 9/2000 | Lotspiech et al. | 6,557,031 | B1 | 4/2003 | Mimura et al. |
| 6,134,237 | A | 10/2000 | Brailean et al. | 6,587,561 | B1 | 7/2003 | Sered et al. |
| 6,134,551 | A | 10/2000 | Aucsmith | 6,590,979 | B1 | 7/2003 | Ryan |
| 6,138,237 | A | 10/2000 | Ruben et al. | 6,621,979 | B1 * | 9/2003 | Eerenberg et al. ............. 386/68 |
| 6,148,082 | A | 11/2000 | Slattery et al. | 6,640,145 | B2 | 10/2003 | Hoffberg et al. |
| 6,154,206 | A | 11/2000 | Ludtke | 6,640,305 | B2 | 10/2003 | Kocher et al. |
| 6,157,719 | A | 12/2000 | Wasilewski et al. | 6,643,298 | B1 | 11/2003 | Brunheroto et al. |
| 6,181,334 | B1 | 1/2001 | Freeman et al. | 6,650,754 | B2 | 11/2003 | Akiyama et al. |
| 6,185,369 | B1 | 2/2001 | Ko et al. | 6,654,389 | B1 | 11/2003 | Brunheroto et al. |
| 6,185,546 | B1 | 2/2001 | Davis | 6,678,740 | B1 | 1/2004 | Rakib et al. |
| 6,189,096 | B1 | 2/2001 | Haverty | 6,681,326 | B2 | 1/2004 | Son et al. |
| 6,192,131 | B1 | 2/2001 | Geer et al. | 6,684,250 | B2 | 1/2004 | Anderson et al. |
| 6,199,053 | B1 | 3/2001 | Herbert et al. | 6,697,489 | B1 | 2/2004 | Candelore |
| 6,201,927 | B1 | 3/2001 | Comer | 6,697,944 | B1 | 2/2004 | Jones et al. |
| 6,204,843 | B1 | 3/2001 | Freeman et al. | 6,701,258 | B2 | 3/2004 | Kramb et al. |
| 6,209,098 | B1 | 3/2001 | Davis | 6,707,696 | B1 | 3/2004 | Turner et al. |
| 6,215,484 | B1 | 4/2001 | Freeman et al. | 6,714,650 | B1 | 3/2004 | Maillard et al. |
| 6,219,358 | B1 | 4/2001 | Pinder et al. | 6,754,276 | B1 | 6/2004 | Harumoto et al. |
| 6,222,924 | B1 | 4/2001 | Salomaki | 6,772,340 | B1 | 8/2004 | Peinado et al. |
| 6,223,290 | B1 | 4/2001 | Larsen et al. | 6,788,690 | B1 | 9/2004 | Harri |
| 6,226,618 | B1 | 5/2001 | Downs | 6,788,882 | B1 | 9/2004 | Geer et al. |
| 6,229,895 | B1 | 5/2001 | Son et al. | 6,826,185 | B1 | 11/2004 | Montanaro et al. |
| 6,230,194 | B1 | 5/2001 | Frailong et al. | 6,853,728 | B1 * | 2/2005 | Kahn et al. ................. 380/239 |
| 6,230,266 | B1 | 5/2001 | Perlman et al. | 6,883,050 | B1 | 4/2005 | Safadi |
| 6,236,727 | B1 | 5/2001 | Ciacelli et al. | 6,891,565 | B1 | 5/2005 | Dietrich |
| 6,240,553 | B1 | 5/2001 | Son et al. | 6,895,128 | B2 | 5/2005 | Bohnenkamp |
| 6,246,720 | B1 | 6/2001 | Kutner et al. | 6,904,520 | B1 | 6/2005 | Rosset et al. |
| 6,256,747 | B1 | 7/2001 | Inohara et al. | 6,917,684 | B1 | 7/2005 | Tatebayashi et al. |
| 6,263,506 | B1 | 7/2001 | Ezaki et al. | 6,925,180 | B2 | 8/2005 | Iwamura |
| 6,266,416 | B1 | 7/2001 | Sigbjornsen et al. | 6,938,162 | B1 | 8/2005 | Nagai et al. |
| 6,266,480 | B1 | 7/2001 | Ezaki et al. | 6,976,166 | B2 | 12/2005 | Herley et al. |
| 6,272,538 | B1 | 8/2001 | Holden et al. | 6,988,238 | B1 * | 1/2006 | Kovacevic et al. .......... 714/799 |
| 6,278,783 | B1 | 8/2001 | Kocher et al. | 7,039,802 | B1 | 5/2006 | Eskicioglu et al. |
| 6,289,455 | B1 | 9/2001 | Kocher et al. | 7,055,166 | B1 | 5/2006 | Logan et al. |
| 6,292,568 | B1 | 9/2001 | Akins, III et al. | 7,065,213 | B2 | 6/2006 | Pinder |

| | | |
|---|---|---|
| 7,079,752 B1 | 7/2006 | Leyendecker |
| 7,089,579 B1 * | 8/2006 | Mao et al. .................. 725/109 |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore |
| 7,127,619 B2 | 10/2006 | Unger et al. |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |
| 7,158,185 B2 | 1/2007 | Gastaldi |
| 7,194,758 B1 | 3/2007 | Waki et al. |
| 7,221,706 B2 | 5/2007 | Zhao et al. |
| 7,292,692 B2 * | 11/2007 | Bonan et al. ................ 380/212 |
| 7,336,785 B1 | 2/2008 | Lu et al. |
| 7,391,866 B2 * | 6/2008 | Fukami et al. ............. 380/210 |
| 7,508,454 B1 * | 3/2009 | Vantalon et al. ............ 348/571 |
| 2001/0013123 A1 | 8/2001 | Freeman et al. |
| 2001/0030959 A1 | 10/2001 | Ozawa et al. |
| 2001/0036271 A1 | 11/2001 | Javed |
| 2002/0003881 A1 | 1/2002 | Reitmeier et al. |
| 2002/0021805 A1 | 2/2002 | Schumann et al. |
| 2002/0026587 A1 | 2/2002 | Talstra et al. |
| 2002/0044558 A1 | 4/2002 | Gobbi et al. |
| 2002/0046406 A1 | 4/2002 | Chelehmal et al. |
| 2002/0047915 A1 | 4/2002 | Misu |
| 2002/0059425 A1 | 5/2002 | Belfiore et al. |
| 2002/0066101 A1 | 5/2002 | Gordon et al. |
| 2002/0067436 A1 | 6/2002 | Shirahama et al. |
| 2002/0083317 A1 | 6/2002 | Ohta et al. |
| 2002/0083438 A1 | 6/2002 | So et al. |
| 2002/0083439 A1 | 6/2002 | Eldering |
| 2002/0097322 A1 | 7/2002 | Monroe et al. |
| 2002/0100054 A1 | 7/2002 | Feinberg et al. |
| 2002/0108035 A1 | 8/2002 | Herley et al. |
| 2002/0109707 A1 | 8/2002 | Lao et al. |
| 2002/0116705 A1 | 8/2002 | Perlman et al. |
| 2002/0126890 A1 | 9/2002 | Katayama et al. |
| 2002/0129243 A1 | 9/2002 | Nanjundiah |
| 2002/0144116 A1 | 10/2002 | Giobbi |
| 2002/0144260 A1 | 10/2002 | Devara |
| 2002/0150239 A1 | 10/2002 | Carny et al. |
| 2002/0157115 A1 | 10/2002 | Lu |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0194589 A1 | 12/2002 | Cristofalo et al. |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0037421 A1 | 2/2004 | Truman |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0083177 A1 * | 4/2004 | Chen et al. .................... 705/50 |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0264924 A1 | 12/2004 | Campisano et al. |
| 2004/0267602 A1 | 12/2004 | Gaydos et al. |
| 2005/0004875 A1 | 1/2005 | Kontio et al. |
| 2005/0015816 A1 | 1/2005 | Christofalo et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |

| | | | |
|---|---|---|---|
| 2005/0169473 A1 | 8/2005 | Candelore | |
| 2005/0192904 A1 | 9/2005 | Candelore | |
| 2005/0198586 A1 | 9/2005 | Sekiguchi et al. | |
| 2005/0259813 A1 | 11/2005 | Wasilewski et al. | |
| 2005/0283797 A1 | 12/2005 | Eldering et al. | |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0136976 A1 | 6/2006 | Coupe et al. | |
| 2006/0153379 A1 | 7/2006 | Candelore et al. | |
| 2006/0168616 A1 | 7/2006 | Candelore | |
| 2006/0174264 A1 | 8/2006 | Candelore | |
| 2006/0262926 A1 | 11/2006 | Candelore et al. | |
| 2006/0269060 A1 | 11/2006 | Candelore et al. | |
| 2007/0091886 A1 | 4/2007 | Davis et al. | |

FOREIGN PATENT DOCUMENTS

| | | | |
|---|---|---|---|
| EP | 0471373 | 2/1992 | |
| EP | 0527611 | 7/1992 | |
| EP | 0558016 | 2/1993 | |
| EP | 0596826 | 4/1993 | |
| EP | 0610587 | 12/1993 | |
| EP | 0680209 | 4/1995 | |
| EP | 0674440 | 9/1995 | |
| EP | 0674441 | 9/1995 | |
| EP | 0720374 | 7/1996 | |
| EP | 0382764 | 4/1997 | |
| EP | 0833517 | 4/1998 | |
| EP | 0866615 | 9/1998 | |
| EP | 1187483 | 3/2002 | |
| JP | 07-046575 | 2/1995 | |
| JP | 7067028 | 3/1995 | |
| JP | 11243534 | 10/2002 | |
| KR | 299634 | 8/2008 | |
| WO | WO 86/07224 | 12/1986 | |
| WO | WO 93/09525 | 5/1993 | |
| WO | WO 94/10775 | 5/1994 | |
| WO | WO 94/13081 | 6/1994 | |
| WO | WO 97/38530 | 10/1997 | |
| WO | WO 98/08341 | 2/1998 | |
| WO | WO 00/31964 | 6/2000 | |
| WO | WO 00/59203 | 10/2000 | |
| WO | WO 00/60846 | 10/2000 | |
| WO | WO 00/64164 | 10/2000 | |
| WO | WO 00/70817 | 11/2000 | |
| WO | WO 01/26372 | 4/2001 | |
| WO | WO 01/65762 | 9/2001 | |
| WO | WO 01/67667 | 9/2001 | |
| WO | WO 01/78386 | 10/2001 | |
| WO | WO 02/51096 | 6/2002 | |

OTHER PUBLICATIONS

PCT/US04/32229, Notification of Transmittal of The International Search Report and The Written Opinion of the International Searching Authority, or the Declaration, Feb. 14, 2006.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

Written Opinion of the International Searching Authority, International Application No. PCT/US04/32231, Mar. 14, 2006.

Written Opinion of the International Searching Authority, PCT/US04/32229 (filed Sep. 30, 2004), Feb. 14, 2006.

"How Networks Work—Milennium Edition"—pp. 88-89, Que Corporation, 2000.

Liu, et al. Motion Vector Encryption in Multimedia Streaming, 2004, IEEE, pp. 64-71.

"A Report on Security Issues in Multimedia" by Gulwani, pp. 10-14, Apr. 30, 2000, Course Notes, Department of Computer Science and Engineering, Indian Institute of Technology Kanpur.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"DVD Demystified—The Guidebook for DVD-Video and DVD-ROM" by Jim Taylor, Pub. McGraw-Hill, 1998, ISBN: 0-07-064841-7, pp. 134-147.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Performance Study of a Selective Encryption Scheme for the Security of Networked, Real-Time Video" by Spanos and Maples, pp. 2-10, 1995, IEEE.

"The Long March to Interoperable Digital Rights Management" by Koenen et al., pp. 1-17, 2004, IEEE.

Anonymous, Message Authentication with Partial Encryption, Research discosure RD 296086, Dec. 10, 1998.

Anonymous, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

"MPEG-2 Transmission," Dr. Gorry Fairhurst, Jan. 2001.

Chinese Office Action for Chinese Patent Application No. 200480032826.0 issued Oct. 10, 2008, received Nov. 10, 2008.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

U.S. Appl. No. 10/038,217, filed Jan. 2, 2002, Critical Packet Partial Encryption.

U.S. Appl. No. 10/038,032, filed Jan. 2, 2002, Time Division Partial Encryption.

U.S. Appl. No. 10/037,914, filed Jan. 2, 2002, Elementary Stream Partial Encryption.

U.S. Appl. No. 10/037,499, filed Jan. 2, 2002, Partial Encryption and PID Mapping.

U.S. Appl. No. 10/037,498, filed Jan. 2, 2002, Decoding and Decryption of Partially Encrypted Information.

U.S. Appl. No. 10/273,905, filed Oct. 18, 2002, Video Slice and Active Region Based Dual Partial Encryption.

U.S. Appl. No. 10/319,133, filed Dec. 13, 2002, Selective Encryption for Video on Demand.

U.S. Appl. No. 10/273,875, filed Oct. 18, 2002, Encryption and Content Control in a Digital Broadcast System.

U.S. Appl. No. 10/084,106, filed Feb. 27, 2002, Reconstitution of Program Streams Split Across Multiple Program Identifiers.
U.S. Appl. No. 10/273,903, filed Oct. 18, 2002, Star Pattern Partial Encryption.
U.S. Appl. No. 10/274,084, filed Oct. 18, 2002, Slice Mask and Moat Pattern Partial Encryption.
U.S. Appl. No. 10/319,066, filed Dec. 13, 2002, Content Replacement by PID Mapping.
U.S. Appl. No. 10/293,761, filed Nov. 13, 2002, Upgrading of Encryption.
U.S. Appl. No. 10/318,782, filed Dec. 13, 2002, Content Distribution for Multiple Digital Rights Management.
U.S. Appl. No. 10/319,169, filed Dec. 13, 2002, Selective Encryption to Enable Multiple Decryption Keys.
U.S. Appl. No. 10/273,904, filed Oct. 18, 2002, Multiple Partial Encryption Using Retuning.
U.S. Appl. No. 10/319,096, filed Dec. 13, 2002, Selective Encryption to Enable Trick Play, Abandoned.
U.S. Appl. No. 10/391,940, filed Mar. 19, 2003, Selective Encryption to Enable Trick Play.
U.S. Appl. No. 10/303,594, filed Nov. 25, 2002, Progressive Video Refresh Slice Detection.
U.S. Appl. No. 10/274,019, filed Oct. 18, 2002, Video Scene Change Detection.
U.S. Appl. No. 10/393,324, filed Mar. 20, 2003, Auxiliary Program Association Table.
U.S. Appl. No. 10/373,479, filed Feb. 24, 2003, PID Filter Based Network Routing.
U.S. Appl. No. 10/767,421, filed Jan. 29, 2004, Content Scrambling With Minimal Impact on Legacy Devices.
U.S. Appl. No. 10/662,585, filed Sep. 15, 2003, Decryption System.
U.S. Appl. No. 10/667,614, filed Sep. 22, 2003, Modifying Content Rating.
U.S. Appl. No. 10/634,546, filed Aug. 5, 2003, Variable Perspective View of Video Images.
U.S. Appl. No. 10/822,891, filed Apr. 13, 2004, Macro-Block Based Content Replacement by PID Mapping.
U.S. Appl. No. 10/764,202, filed Jan. 23, 2004, Re-Encrypted Delivery of Video On Demand Content.
U.S. Appl. No. 10/828,737, filed Apr. 21, 2004, Batch Mode Session-based Encryption of Video on Demand Content.
U.S. Appl. No. 10/764,011, filed Jan. 23, 2004, Bi-Directional Indices for Trick Mode Video-on-Demand.
U.S. Appl. No. 10/802,084, filed Mar. 16, 2004, Hybrid Storage of Video on Demand Content.
U.S. Appl. No. 10/802,007, filed Mar. 16, 2004, Dynamic Composition of Pre-Encrypted Video on Demand Content.
U.S. Appl. No. 10/774,871, filed Feb. 9, 2004, Cablecard with Content Manipulation.
U.S. Appl. No. 10/802,008, filed Mar. 16, 2004, Preparation of Content for Multiple Conditional Access Methods in Video on Demand.
U.S. Appl. No. 10/823,431, filed Apr. 13, 2004, Composite Session-Based Encryption of Video on Demand.
U.S. Appl. No. 10/964,267, filed Oct. 13, 2004, Multiple Selective Encryption with DRM.
U.S. Appl. No. 10/763,865, filed Jan. 22, 2004, Method And Apparatus For Securing Control Words.
U.S. Appl. No. 10/387,163, filed Mar. 22, 2003, Method and Apparatus for Protecting the Transfer of Data.
U.S. Appl. No. 10/815,371, filed Mar. 31, 2004, IP Delivery of Secure Digital Content.
U.S. Appl. No. 10/764,682, filed Jan. 23, 2004, System, Method and Apparatus for Secure Digital Content Transmission.
U.S. Appl. No. 10/388,002, filed Mar 12, 2003, Mechanism for Protecting the Transfer of Digital Content.
U.S. Appl. No. 10/690,192, filed Mar. 12, 2003, Descrambler.
U.S. Appl. No. 10/691,170, filed Oct. 5, 2003, Multi-Process.
U.S. Appl. No. 10/403,834, filed Mar. 31, 2003, System and Method for Partially Encrypted Multimedia System.

* cited by examiner

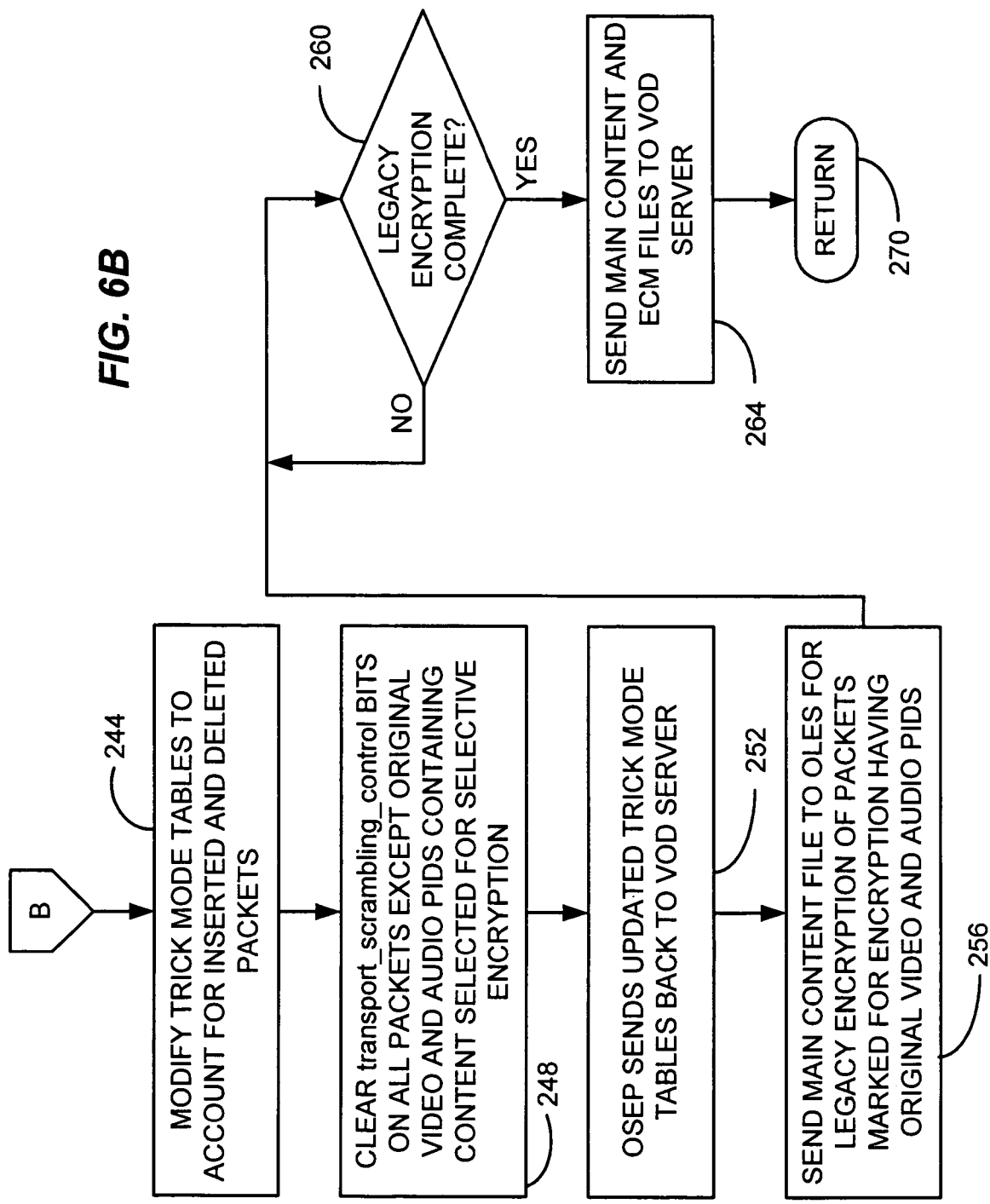

PREPARATION OF CONTENT FOR MULTIPLE CONDITIONAL ACCESS METHODS IN VIDEO ON DEMAND

CROSS REFERENCE TO RELATED DOCUMENTS

This application is related to and claims priority benefit of U.S. Provisional Patent Application Ser. No. 60/516,867 filed Nov. 3, 2003 to Pedlow et al. for "Process for Preparing Pre-Encrypted Content for Multiple Conditional Access Methods" which is hereby incorporated by reference. This application is also related to U.S. Patent Application entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. At present, in the USA, these networks are most commonly supplied by either Motorola (formerly General Instrument) or Scientific Atlanta. These two companies at present constitute better than a 99% share of the U.S. cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access (CA) systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. Some of the basic processes used in these technologies are discussed in detail in the above-referenced pending patent applications.

The above-referenced commonly owned patent applications, and others, describe inventions relating to various aspects of methods generally referred to herein as partial encryption or selective encryptions consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers (subscriber terminals) from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (e.g., shadow PIDs remapped to the primary PID value or vice versa.)

For video-on-demand (VOD) applications, many of the precepts originally established for Passage™ are rendered inapplicable due to content being distributed in a session-based fashion as opposed to the case of a broadcast model, where it is distributed as a single instance of content, which is shared by multiple recipients. Since there is no concurrently shared content in the session-based distribution model, there is no longer a need to embellish the transmitted stream with additional content to allow simultaneous decryption under the control of multiple conditional access methods. Instead, there is a new challenge posed to store the content in a form supporting the incumbent's existing pre-encryption model and still allow embellishment to support other conditional access methods. The preparation of content for encryption prior to storage in the VOD server using Motorola conditional access systems is through the use of a Motorola supplied device called an OLES (Off Line Encryption System).

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

ACRONYMS, ABBREVIATIONS AND DEFINITIONS

ASI—Asynchronous Serial Interface

CA—Conditional Access

CASID—Conditional Access System Identifier

CPE—Customer Premises Equipment

DHEI—Digital Headend Extended Interface

ECM—Entitlement Control Message

EPG—Electronic Program Guide

GOP—Group of Pictures (MPEG)

MPEG—Moving Pictures Experts Group

MSO—Multiple System Operator

OLES—Off Line Encryption System

OSEP—Offline Selective Encryption Processor

PAT—Program Allocation Table

PID—Packet Identifier

PMT—Program Map Table

POP—Passage™ Offline Processor

PCR—Program Clock Reference

PSI—Program Specific Information

QAM—Quadrature Amplitude Modulation

RAID—Redundant Array of Independent Disks

RAM—Random Access Memory

SAN—Storage Area Network

VOD—Video on Demand

Figure 1:
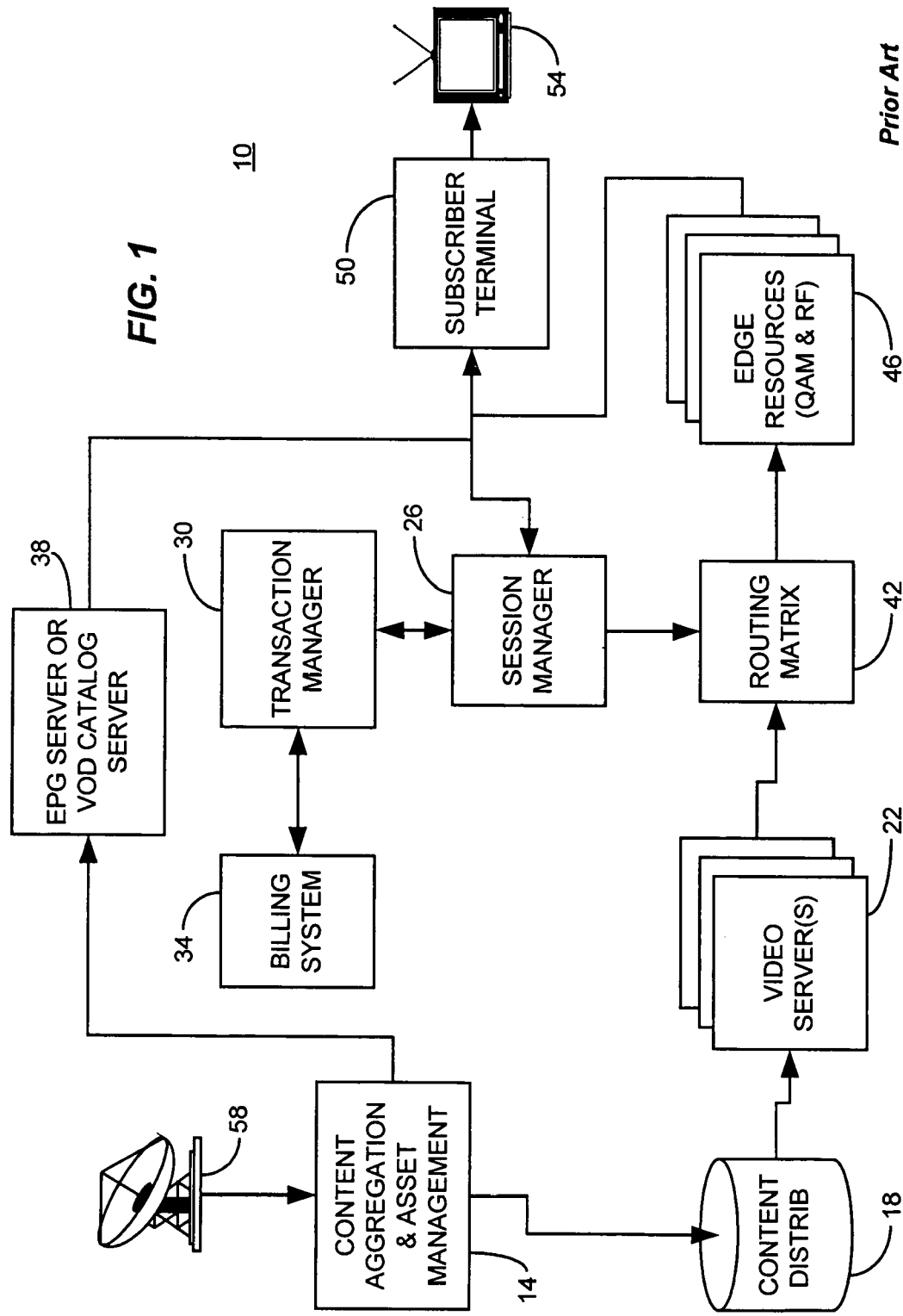
FIG. 1 is a block diagram of a clear video VOD system.

Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.

Selective Encryption (or Partial Encryption)—encryption of only a portion of an elementary stream in order to render the stream difficult or impossible to use (i.e., view or hear).

Dual Selective Encryption—encryption of portions of a single selection of content under two separate encryption systems.

Passage™—Trademark of Sony Electronics Inc. for various single and multiple selective encryption systems, devices and processes.

Trick mode—an operational mode of playback of digital content to simulate fast forward, rewind, pause, suspend (stop), slow motion, etc. operations as in a video tape system.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "storing" as used herein means both the act of placing data into a storage medium and holding the data in storage in the storage medium. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The term PID can generally be interpreted to mean either a single PID or a set of PIDs, and similarly, a set of PIDs may include only a single PID.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Clear VOD Architectures

The decision on a particular VOD architecture is the result of the interaction between a complex set of both independent and dependent variables, providing a solution to an equation of state. Some of the variables are fixed directly as a result of choices by the MSO. Others are constrained by factors such as the existing incumbent system, location, size, available capital and ROI requirements.

A generalized VOD system 10, as shown in FIG. 1, contains some or all of the following elements/resources: Content Aggregation and Asset management 14, Content distribution (SAN) 18, Video server module(s) 22, Session Management 26, Transaction management 30, Billing system 34, EPG server or VOD catalog server 38, Transport router/switch fabric (routing matrix) 42, Stream encryption device(s) (not shown in this Figure), and QAM modulators/upconverters and other edge resources 46. This VOD system 10 provides programming to the subscriber terminals such as 50 for ultimate viewing and listening on a TV set or other monitor device 54.

In operation, content is received from various sources including, but not limited to, satellite broadcasts received via one or more satellite dishes 58. Content is aggregated at 14 and cataloged at EPG server or VOD catalog server 38. Content is then distributed at 18 to one or more video servers 22. When a subscriber orders a VOD selection, a message is sent from the subscriber terminal (e.g., STB) 50 to the session manager 26. The session manager 26 notifies the transaction manager 30 to assure that the billing system 34 is properly brought into play. The session manager 26 selects a VOD server from a cluster of VOD servers having the requested content on it and having a signal path that reaches the node serving the subscriber. The session manager also enables the routing matrix 42 to properly route the selected video content through the correct edge resources 46 for delivery to the subscriber terminal 50.

Trick Modes

Figure 2:
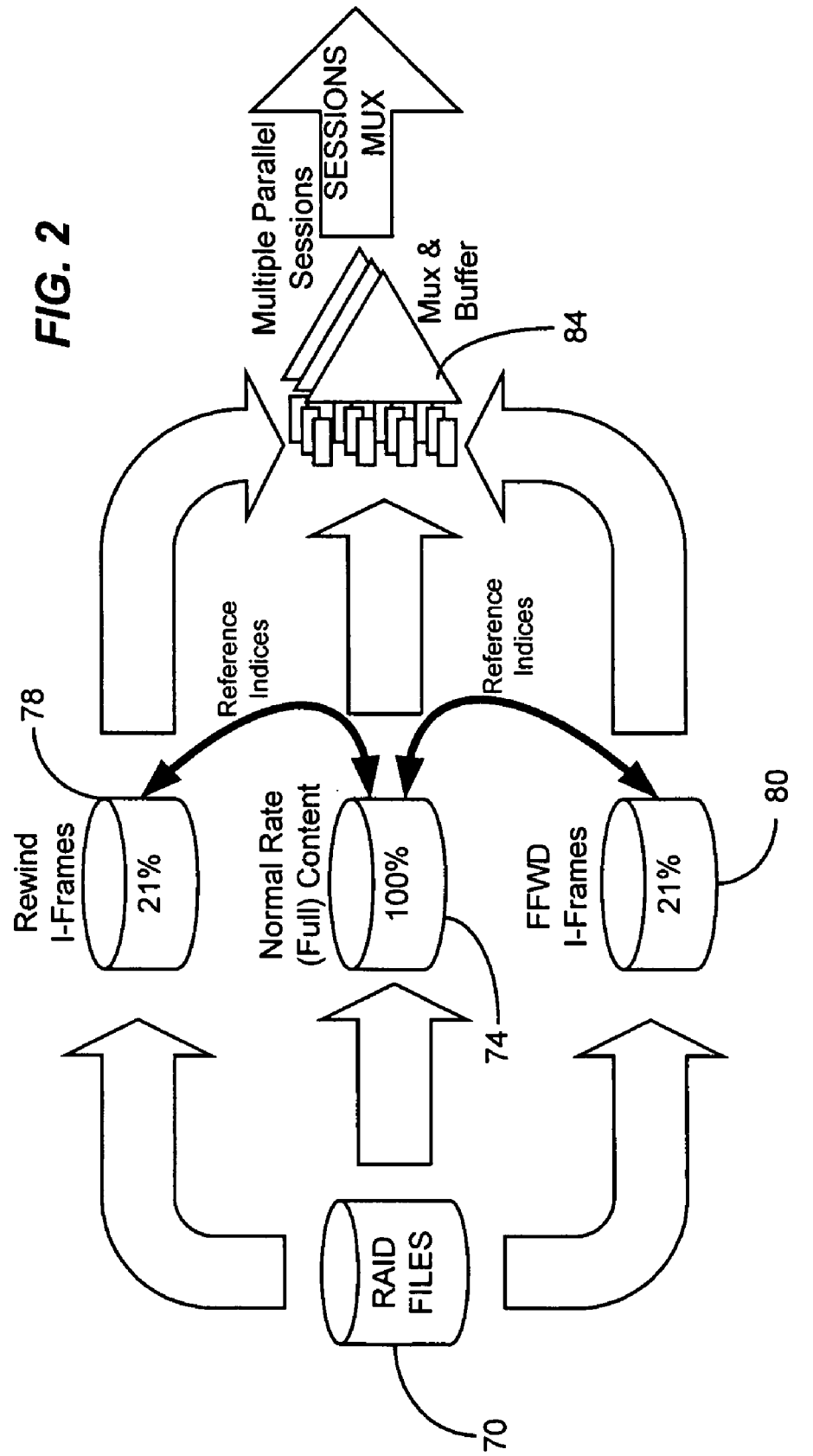
FIG. 2 is a diagram illustrating storage of I-frame data to support trick mode operation in a VOD system.

One aspect of VOD that has become a "signature" feature is the support of "trick modes". These are operational modes invoked by the session client that mimic a traditional VCR or DVD player and includes fast forward, rewind, pause, suspend (stop), slow motion, etc. Trick modes have been heretofore implemented through the creation of multiple files containing a subset of the original content (subfiles) as illustrated in FIG. 2. The content is generally stored in a set of RAID drives 70. A particular selection of content is stored in its entirety in a file 74 within the RAID drives 70. A set of subfiles for rewind and fast forward trick modes (files 78 and 80 respectively) contain I-frames ordered in a manner that will permit playback sequentially to achieve the rewind and fast forward effect. Typically, these subfiles contain only I-frames, since I-frames contain stand-alone whole pictures (see ISO/IEC 13818-2, section 6.1.1.7). I-frames are somewhat larger than B or P frames, and they typically represent approximately as much as 21% of the data in a given video selection.

A file containing only I-frames extracted from the original content affords the ability to have accelerated playback, since typical GOP (group of pictures) structures have only one frame in about 10 to 20 as an I-frame. If the I-frame files are played at normal rates (1 frame per 33 mS) the pictures will appear to the viewer to sequence at about a 10× to 20× rate, though the actual data rate is the same as the original content. If the I-frame sequence is reversed in the file, the motion will appear to run backwards. This is the method used to implement fast forward and rewind trick modes.

By attaching an index count to match the I-frames in the original content file to the duplicated I-frames stored in the associated subfiles 78 and 80, a method is provided to allow immediate transition from normal speed forward play to fast forward or rewind. In operation the video server plays the selected content file and upon subscriber selection of a trick mode (or vice versa) the server notes the index value of the closest I-frame and then opens the appropriate associated subfile 78 or 80 and moves to the I-frame in the subfile with the same corresponding index. The video server treats all stream content (main file or subfiles) the same and always spools the MPEG packets to the outgoing transport stream at the same constant bit rate through multiplexers and buffers 84 as shown. It is through this method that trick modes are typically implemented on a slotted, session based system without the encumbrance of additional, dynamic bit rate issues.

Unfortunately, the use of such multiple subfiles results in storage space inefficiencies. As will be seen, these inefficiencies can become compounded in systems utilizing multiple encryptions (e.g., multiple selective encryption).

VOD Program Specific Information

A function of the VOD video server(s) 22, in addition to origination of session A/V content, is the creation of the associated, session specific PSI (program specific information). This information is a departure from the broadcast model in that the PSI is extremely dynamic. The content of the PAT and subordinate PMTs change whenever a new session is started or ended. In the broadcast world, the PSI changes very seldom because the PSI tables reflect only the structure of the transport multiplex, not the actual A/V content carried within.

The VOD video server 22 dynamically assigns a new session to an existing, available "slot" in an outgoing transport multiplexed stream. The slot is denoted by the MPEG program number and in many cases, the combination of which transport stream (TSID) and program number determine at the service level a unique session and the routing that occurs as a result. Edge resources 46 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the VOD system so that once a session is requested by and authorized for a specific subscriber terminal 50, a solution to a routing matrix 42 can be determined to find the appropriate VOD server 22 and QAM transport 46 serving the requestor. This solution also considers dynamic issues such as which servers 22 the requested asset is loaded upon, and server loading/available slots in addition to the simpler, static solution to finding the first possible path to the requesting subscriber terminal 50.

In addition to solving the routing matrix 42 and provisioning the session with PIDs and PSI appropriate to follow the intended route, elements of the same information (program ID and QAM frequency) are also communicated to the session client at subscriber terminal 50 at the subscriber's premises so that the requested stream can be properly received and presented to the subscriber.

Clear VOD Distribution

Perhaps the simplest VOD distribution system implementation is a clear VOD distribution system, i.e. one that contains no encryption as depicted in FIG. 1. While not providing any safekeeping of what might be considered the entertainment medium's most valuable properties, namely current feature films, etc., clear VOD avoids many of the issues that the incumbent cable system providers to date have not adequately addressed and that introduction of a second, alternative CA system complicates even further still. Various arrangements for providing selective or full encryption in a VOD environment are discussed below. Throughout this discussion, it is instructive to carry an example VOD movie through the various embodiments to illustrate the relative storage efficiencies obtained with the various systems disclosed. A real world example of a VOD movie which will be used throughout this document has the following attributes:

| Compressed video data rate: | 3 Mbit/S |
|---|---|
| Movie length: | 120 minutes (2 Hrs) |
| I-frame overhead: | 17% |
| Total storage used for the video portion of a single, clear (unencrypted) copy of a film: | 3.618 GBytes. |

Pre-Encrypted VOD Distribution

Figure 3:
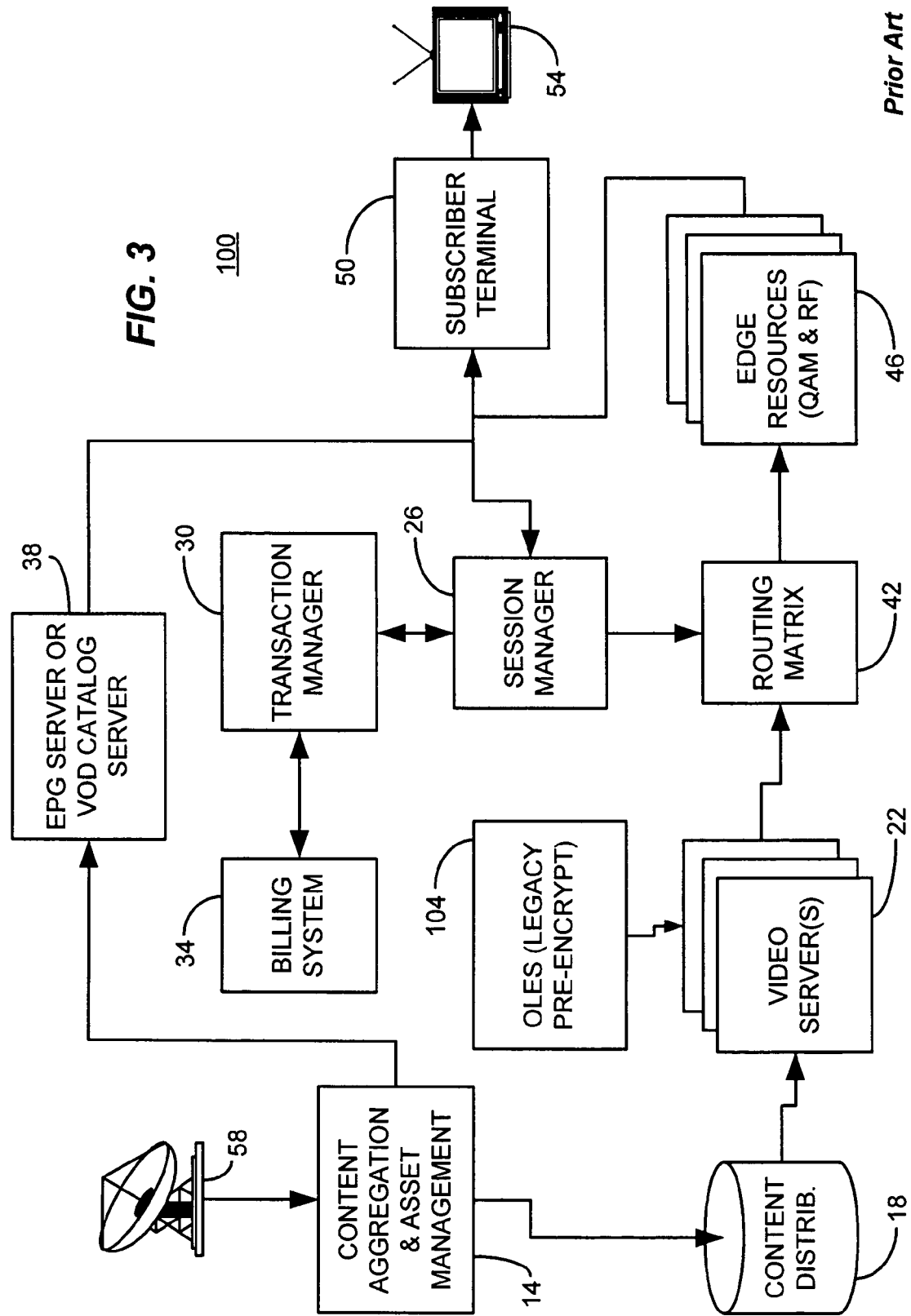
FIG. 3 is a block diagram of a pre-encrypted VOD system using a single (legacy) encryption system.

Pre-encrypted VOD systems such as system 100 shown in FIG. 3 can be architecturally similar to clear VOD distribution systems. One difference between the two is that on pre-encrypted systems there is pre-processing of the content prior to storage in the VOD system to provide safekeeping of content during the storage and distribution phases. This pre-processing can be carried out in pre-encrypter 104. Data security is implemented through storage of previously encrypted content within the video server(s) 22. While the clear VOD system contains directly viewable MPEG or other compressed A/V content on the server(s) 22, the pre-encrypted model stores this same content in a form that is only decipherable using a properly entitled subscriber terminal 50.

The pre-encryption process can be performed by the MSO at the time of deployment on the VOD system 100, prior to loading into the storage area network (SAN) used to propagate content to all of the video servers in the MSO's system. Alternatively, the encryption may be performed prior to receipt of the content by the MSO at an external service bureau, content aggregator or by the distributor or studio. In this case, the content is theoretically secured throughout the distribution phase, storage phase and transmission to subscriber for display on an authorized device. The use of pre-encryption prior to distribution of content to the MSO potentially adds to the complexity of entitlement distribution, separate from the content distribution, for installation on the VOD transaction manager 30 to allow bone fide subscribers to decrypt the purchased content. For purposes of this document, content will be considered stored in the VOD video server if it is stored either directly in the VOD video server or indirectly in the VOD video server (i.e., is accessible by the VOD video server).

Segregated Storage Pre-Encryption

A segregated storage mechanism can be physically similar to the architecture of the clear VOD distribution system. The content is encrypted in its entirety (100%) and a separate copy of the complete feature is stored for each different conditional access format supported by the MSO. The organization and configuration of the system is such that when a subscriber initiates a session on the server, the stream files for the selected content containing the CA format appropriate to the specific equipment deployed at the subscriber's premises requesting the session are spooled and delivered. This method offers a low system complexity encrypted VOD system but may suffer from some of the same issues common to other pre-encryption topologies, mentioned previously. In addition, a very significant storage penalty (one or more encrypted duplicate copies of the same movie) is incurred.

If one refers to the example movie scenario described above, the same movie using 3.618 GB of storage in the clear VOD state would require an additional 7.236 GBytes to store using segregated pre-encryption supporting two different CA systems.

Changes to the method employed by the VOD system are used for creating dynamic PSI data to implement this architecture supporting multiple CA systems. The VOD system session manager is made aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these resources can be dynamically allocated on unique PIDs along with PIDs for the corresponding audio and video data. The PSI generated for each specific session, in addition to indicating the assigned PIDs for A/V, indicate the appropriate CASID, which is unique to each conditional access system provider and the PID assigned for the ECMs associated with the session.

Composite Storage Pre-Encryption

Composite storage is essentially the storage on the video server of a selectively encrypted stream such as a Passage™ processed stream that contains previously encrypted "critical packets" for a plurality (two or more) of independent conditional access systems (i.e., dual selective encrypted). The stream may be prepared identically to the processing of a selectively encrypted broadcast stream as described in the above-referenced pending patent applications, except that the resultant transport stream is recorded to a hard disk or other suitable computer readable storage medium, instead of being sent directly to a QAM modulator for HFC distribution to the requesting subscriber. As with other pre-encryption models, the content can be encrypted by either the MSO at time of deployment on the VOD system, a third party service bureau, by the studios themselves (the latter two cases being prior to receipt of the content by the MSO), or by or under control of other entities.

In this embodiment the small additional overhead in content storage (typically 2%-10% representing "critical packets" that are multiple encrypted) is traded for the support of multiple independent CA formats without replication of entire streams. A negative aspect, in addition to those mentioned previously and common to other pre-encryption topologies, is the vulnerability of the prepared selectively encrypted stream to corruption by downstream equipment containing transport remultiplexing functionality that is not specifically designed to maintain the integrity of the selective encryption process applied to the stream.

If one refers to the example movie scenario described above, the same movie using 3.618 GB of storage in the clear VOD state would require approximately 3.690 GBytes to store using composite storage pre-encryption supporting two different CA systems with a critical packet "density" of 2%.

Certain changes to the method employed by the VOD system for creating dynamic PSI data can be used to implement this architecture. The VOD system session manager can be made to be aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, can indicate the appropriate CASID, which is unique to each conditional access system provider and the PID assigned for the ECMs associated with the session.

Likewise, the video server dynamically allocates another set of PIDs for the shadow packets associated with the respective audio and video component streams for each session in the manner described in the above-referenced patent applications. This information can be included in the PSI sent in sessions requested by non-legacy clients. In total, eight different PIDs and corresponding data resources are dynamically allocated and managed by the server for each session: PAT (one table common to all sessions, but modified for each), PMT, Primary Video, Primary Audio, Shadow Video, Shadow Audio, Legacy ECM and Alternative ECM. Six of these entities can be stored in the embedded stream and use dynamic PID remapping for each session.

Consider the issue of which device to use in conjunction with performing the legacy encryption of the "critical" packets prior to storage on the VOD video server. If the legacy device is specially designed to process content destined for loading into a VOD video server, it may not accept a selectively encrypted stream at its input. The content format specified for VOD servers often uses a single program transport multiplex containing a single PAT entry, single PMT entry and service components, for one audio and one video stream. The shadow packets added in a composite selectively encrypted transport stream may prove problematic for a legacy VOD pre-encryption device, in certain instances. It is more probable that a device or process (since there are no real time requirements, an off-line process running on a PC or UNIX server may suffice) to process a candidate stream before passing through the legacy pre-encrypter and then post-encryption reconcile to extract only the encrypted "critical" packets for insertion into the VOD video server 22. The same or similar algorithms and techniques for performing this manipulation for selective encryption processing as described in the above-referenced patent applications can be adapted to VOD applications for off-line work.

The VOD server 22 may also be modified to allow introduction of streams having multiple service elements (primary video, primary audio, shadow video, shadow audio) uniquely associated with a Passage™ transport. The present video servers generally only allow one each, primary video and audio, respectively. The quartet of data representing Passage™ processed A/V content should preferably be managed as an indivisible set on the VOD video server 22.

Some additional bandwidth efficiencies may be obtained if, at the edge resources, shadow packets are removed from the composite streams in sessions serving legacy clients. Similarly, in certain embodiments, the edge resources, if selective encryption aware, could reinsert the shadow packets embedded in the stored stream in place of the legacy encrypted packets on the original program PID. These improvements would result in no carriage overhead for support of multiple conditional access systems on a single transport.

Hybrid Composite Storage Pre-Encryption

In order to support other conditional access methods, additional processing step can be added to the VOD system. If the additional process is instantiated in a discrete device, it is generally in the form of an intermediary device inserted between the VOD video server and the pre-encryption processor, such as an Off Line Encryption System (OLES). (The present invention should not be construed to be limited to use with Motorola's OLES, but rather can be used in any system having an equivalent functional element without limitation.) Otherwise, the process may be hosted internally within the VOD server (or another processor) as an intermediary process, task or application acting upon the content prior to transfer to the pre-encryption processor. This intermediary, which has been named the Passage™ Offline Processor (POP), is an offline selective encryption processor (OSEP) which performs the determination of critical packets to be encrypted. For encryption systems other than Sony's Passage™ system, the term POP should be interpreted as any OSEP processor or process that carries out similar or equivalent functions.

The target VOD system employs pre-encryption by using what is referred to herein as a hybrid composite storage architecture. Hybrid composite storage is a variant of the composite storage concept described above, but incorporates elements of session-based encryption for implementing an additional alternative conditional access encryption. In this scenario, depicted as system 130 of FIG. 4, the legacy "critical" packets, which according to many selection criteria can encompass approximately 2-10% of the total content, are pre-encrypted by the legacy conditional access system 104 using selective encryption technology for managing the process. The selective encryption is managed in selective encryption processor 134. The duplicate copy of "critical" packets, which are located on previously unused PIDs, is left unencrypted. This latter aspect is the departure from the composite storage scenario described above. The composite stream of unencrypted non-critical packets, legacy encrypted "critical" packets on the original service PIDs and an unencrypted, duplicate copy of the "critical" packets on alternate service PIDs is stored on the video server 22 as a single stream.

Therefore, in the present scenario, the stored content can be viewed as having three distinct parts: A) unencrypted content; B) content selected according to a selective encryption selection criterion and encrypted; and C) duplicates of the content selected according to the selection criterion, but stored in unencrypted form. The unencrypted content (A) represents the content that is not selected according to the selection criterion. Accordingly, a complete set of content can be made up from the unencrypted content (A) plus either (B) or (C) as will be seen later.

Upon playback to a subscriber session, if the session is destined for a legacy STB (represented by subscriber terminal 50), the paradigm for pre-encrypted content described above is followed and no special action is taken. The stream is routed at routing matrix 138 operating under control of session manager 26, through a session encryption device 142 capable of performing encryption using the alternative conditional access system 144, but the session manager 26 does not provision the device to perform encryption on elements of the stream and it is sent directly to the requesting subscriber without further modification. (Alternatively, the alternative CA system 144 can be bypassed.) To maintain security of the outgoing stream and to reduce the bandwidth of the session for legacy sessions, the stream is processed through an add/drop re-multiplexer 148 and the clear "critical" content (C above) on alternate service PIDs are removed from the outgoing transport. As a result, only a selectively encrypted data stream is provided as an output (i.e., the content is secured). The output stream is then routed at routing matrix 152 to appropriate edge resources 46 for delivery to the subscriber terminal 50. In one embodiment, the session encryption device 142 that performs encryption using the alternative conditional access system also contains the add/drop multiplexer capability. Other variations will also occur to those skilled in the art upon consideration of the present teaching.

If, on the other hand, the session is destined for a non-legacy STB (also as represented in this illustration by subscriber terminal 50), the stream is routed through session encryption device 142 capable of performing encryption using the alternative conditional access system and only the "critical" packets (C above) on alternate service PIDs (previously in the clear) are encrypted using the alternative conditional access system 144, as provisioned by the session manager. The stream can be passed through the add/drop multiplexer 148 to drop the redundant encrypted packets (B above) if desired to reduce the bandwidth consumed by the transmission.

Some additional bandwidth efficiencies may be obtained for these non-legacy sessions, if the edge device is selective encryption aware, by reinserting the shadow packets embedded in the stored stream, now encrypted, in place of the legacy encrypted packets on the original program PID, so that the legacy encrypted packets are dropped. This improvement would result in no carriage overhead for support of multiple conditional access systems on a single transport.

In certain embodiments, a preprocessor can be used to perform selective encryption of content to be loaded onto the video server. A modified file protocol can be used to allow the video server to import and associate these files. Either the preprocessor or the video server can be designed to perform the indexing. An alternate instantiation can be used to perform all selective encryption pre-processing (e.g., PID mapping and packet duplication) within the VOD video server 22 itself. This can be accomplished by modifying the VOD video server 22 application to add a pre-processor task as a separate executable, called by the VOD video server 22 during the process to prepare content for pre-encryption.

Changes can be implemented to the method employed by the VOD system for creating dynamic PSI data to implement this architecture. The VOD system session manager 26 is made aware of which conditional access method is appropriate for a session requested by a specific subscriber. This information can in turn be transferred to the VOD video server 22 that has been selected as the source for the session so that the appropriate PSI can be created for the session, including conditional access specific data. The VOD video server 22 is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, can indicate the appropriate CASID, which is unique to each conditional access system provider and the PID assigned for the ECMs associated with the session.

Likewise, the VOD video server 22 dynamically allocates. PIDs for the shadow packets associated with the respective audio and video component streams for each session. This information is included in the PSI sent in sessions requested by non-legacy clients. Just like in the more general composite storage architecture discussed in the previous section, the video server manages multiple resources and PIDs. The hybrid topology reduces the unique entities by one from eight to seven: there is no need for alternative ECM PID or data resource in the stored composite stream. This information will be added later in a downstream device providing the alternative conditional access encryption for those sessions destined for decoding upon a non-legacy client.

Upon playback to a subscriber session, if the session is destined for a legacy STB, the existing paradigm for pre-encrypted content is followed and no special action is taken. The stream is routed through a device capable of performing encryption using the alternative conditional access system, but the session manager does not provision the device to perform encryption on elements of the stream and it is sent directly to the requesting subscriber. To maintain security of the outgoing stream and to reduce the bandwidth of the session for legacy sessions, the stream is processed through an add-drop remultiplexer and the clear "critical" content on alternate service PIDs are removed from the outgoing transport. It is likely that the device that performs encryption using the alternative conditional access system also contains the add-drop remultiplexer capability.

Figure 5:
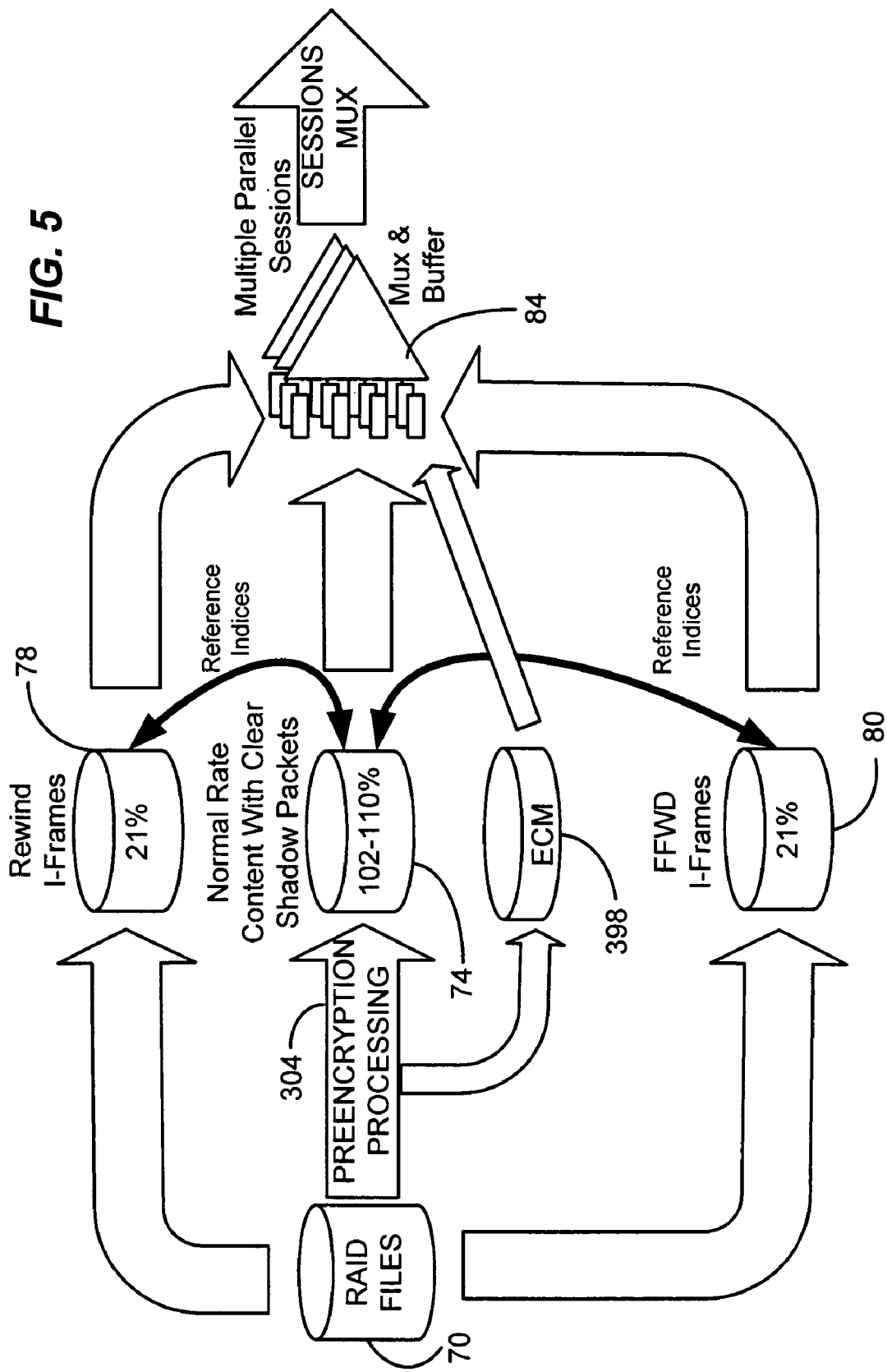
FIG. 5 depicts content flow in a hybrid composite VOD system consistent with certain embodiments of the present invention.

FIG. 5 depicts a storage mechanism that can be used for a hybrid composite storage VOD system as described above. In this arrangement, the normal rate content stored in main content file 74 differs from that of FIG. 2 in that the content contains not only a complete copy of the normal rate content in unencrypted form (identified by primary and shadow PIDS), but also includes a set of packets that are selectively encrypted under the legacy encryption system (e.g., pre-encrypted by the OLES) in pre-encryption processing process 304. Additionally, a separate file 398 can be used to store the ECM data associated with the content. As previously described, the fast forward I frames can be stored at 80 while the fast reverse (rewind) frames can be stored at 78.

When a request is received from a subscriber terminal to transfer a selection of video content to the subscriber terminal, the VOD system determines that the subscriber terminal is able to decrypt content encrypted either under the first encryption system or under a second encryption system. If the subscriber terminal is able to decrypt the content encrypted under the first encryption system (e.g., the legacy encryption system), then the selection of content that has been pre-encrypted under the first encryption system is routed to the subscriber terminal. The unencrypted content can be dropped at add/drop multiplexer 148 and the content passes through encryption device 142 undisturbed. If, however, the subscriber terminal is able to decrypt the content encrypted under the second encryption system (e.g., the new encryption system), then the pre-encrypted packets are dropped at add/drop multiplexer 148 and the selection of content is encrypted under the second encryption system as it passes therethrough and the encrypted selection of content is then routed to the subscriber terminal.

Pre-Encryption Processing

Figure 6A:
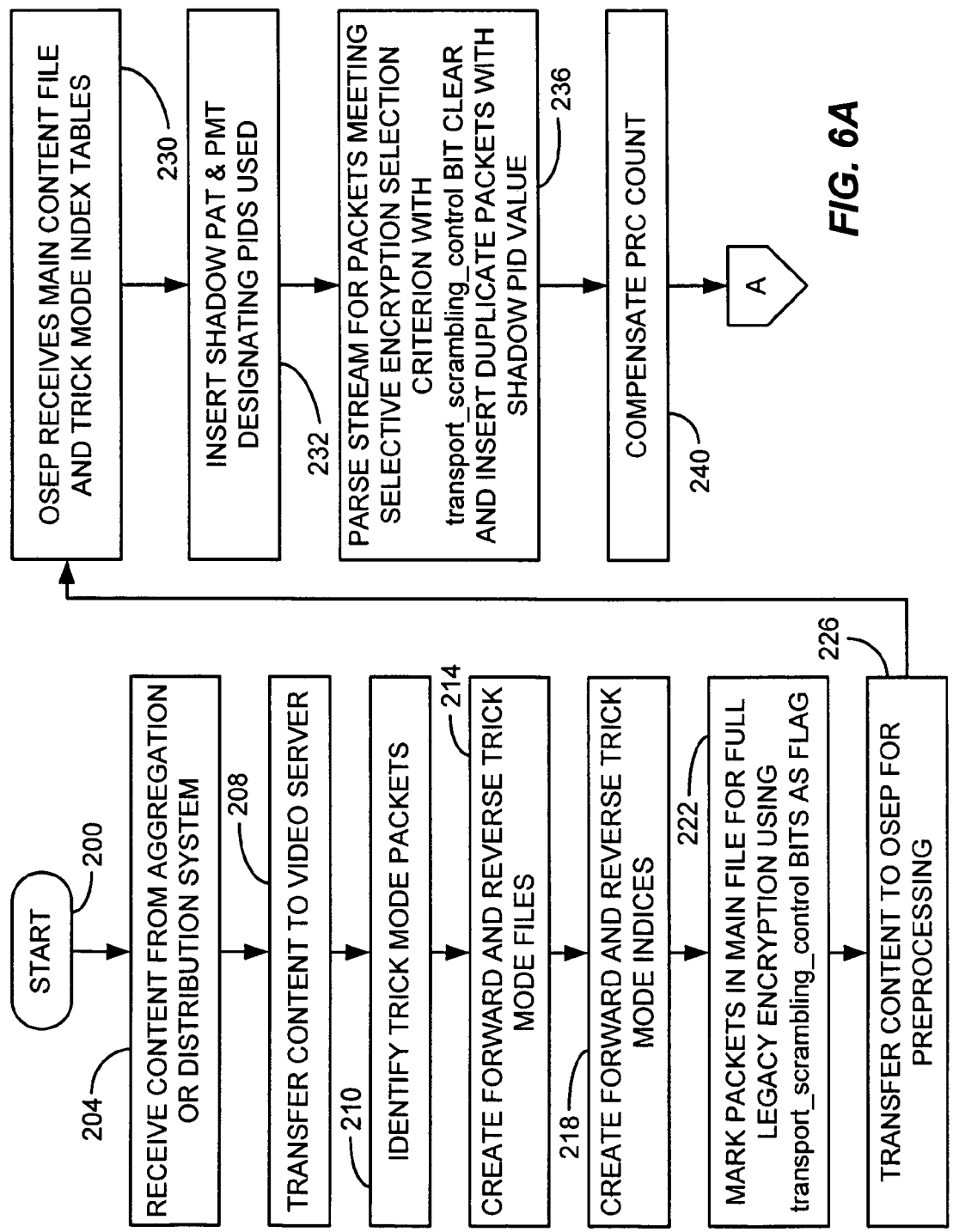
FIG. 6, which is made up of FIG. 6A and FIG. 6B, is a flow chart depicting a process consistent with certain embodiments of the present invention.

The following describes one embodiment of a process, as depicted in FIG. 6, which is made up of FIG. 6A and FIG. 6B, to prepare pre-encrypted content and store it on a VOD server for distribution. Other embodiments are also possible. The process begins at 200 after which content is received from the aggregation or distribution system at 204. At 208, content is transferred to the video server 22 where it is processed to identify packets at 210 to be used in trick modes. At 214, the forward trick mode content file is created using a subset (the I-frames) of the original content. Similarly, at 214, the reverse trick mode content file is created using a subset (the I-frames in reverse order) of the original content.

At 218, the forward index table linking I-frame position in main content to I-frame position in forward trick content file is created and the reverse index table linking I-frame position in main content to I-frame position in reverse trick content file is created. The packets are marked in the main file in a normal manner for legacy encryption using packet transport_scrambling_control bits as flag at 222. A set flag designates a packet to be encrypted while a clear flag designates a packet that is not to be encrypted. Selected packets following I-frames can be skipped to allow dynamic substitution for smooth trick mode transition recovery. The main content file is transferred (e.g., by FTP—file transfer protocol) to the OSEP (e.g., POP) for pre-processing (or equivalently an OSEP process is called on the VOD server or other processor to begin file processing) at 226. When the OSEP receives (or accesses) the main content file and trick mode index tables at 230, it begins processing for support of the selective encryption process.

At 232, a shadow PAT and a shadow PMT are inserted to identify the shadow PIDs to be used for the selective encryption (e.g., Passage™) shadow packets on the audio and the video elementary streams. Based upon any suitable selection criteria (e.g., as described in the above-referenced patent applications), the stream is parsed at 236 for packets containing these "critical" data or structures. When they are encountered, a duplicate copy of the packet is inserted using an externally defined PID value with the transport_scrambling_control bits set clear (i.e., not designated for encryption). At 240, the PCR count value is adjusted in the packets containing adaptation fields, if needed, to reflect the insertion of additional packet(s). Also, if packets are inserted, subsequent null packets encountered can be removed to compensate for inserted packets and restore the PCR count to the original value.

At 244, the trick mode index tables are modified to compensate for inserted/deleted packets in the main content file. At 248, the transport_scrambling_control bits on all packets except those on the original video and audio PIDs containing the detected critical data or structures are cleared. That is, after 248, only packets with original PID values that are designated as meeting the selection criterion for "critical" data or structures will remain marked with a set encryption flag. All other encryption flags are cleared. The OSEP then, at 252, sends (e.g., by FTP) updated trick mode tables to the VOD server (or equivalently the OSEP process running on video server closes). The main content file is then sent (e.g., by FTP) to the OLES for legacy encryption at 256. The VOD server polls the OLES at 260 for completion of the legacy encryption process. When the process is complete, the main content and ECM files are sent (e.g., by FTP) to VOD server at 264 and the process returns at 270.

Thus, a method of processing content in a video on demand (VOD) system, wherein the content is identified by a first set of packet identifiers (PIDs), involves identifying packets of content used in trick play modes; creating forward and reverse trick mode content files and forward and reverse trick mode index tables; marking packets in the content to be encrypted by a first encryption system by setting an encryption flag for all packets designated to be encrypted; selecting packets in the content according to a selective encryption selection criterion to produce selected packets; duplicating the selected packets to produce duplicate copies of the selected packets; identifying the duplicate copies using a second set of PIDs; generating a program association table (PAT) and a program map table (PMT) identifying the second set of PIDs; inserting the duplicate copies of packets identified by the second set of PIDs into the content; and clearing all encryption flags in the content except for the selected packets having the first set of PIDs.

Figure 7:
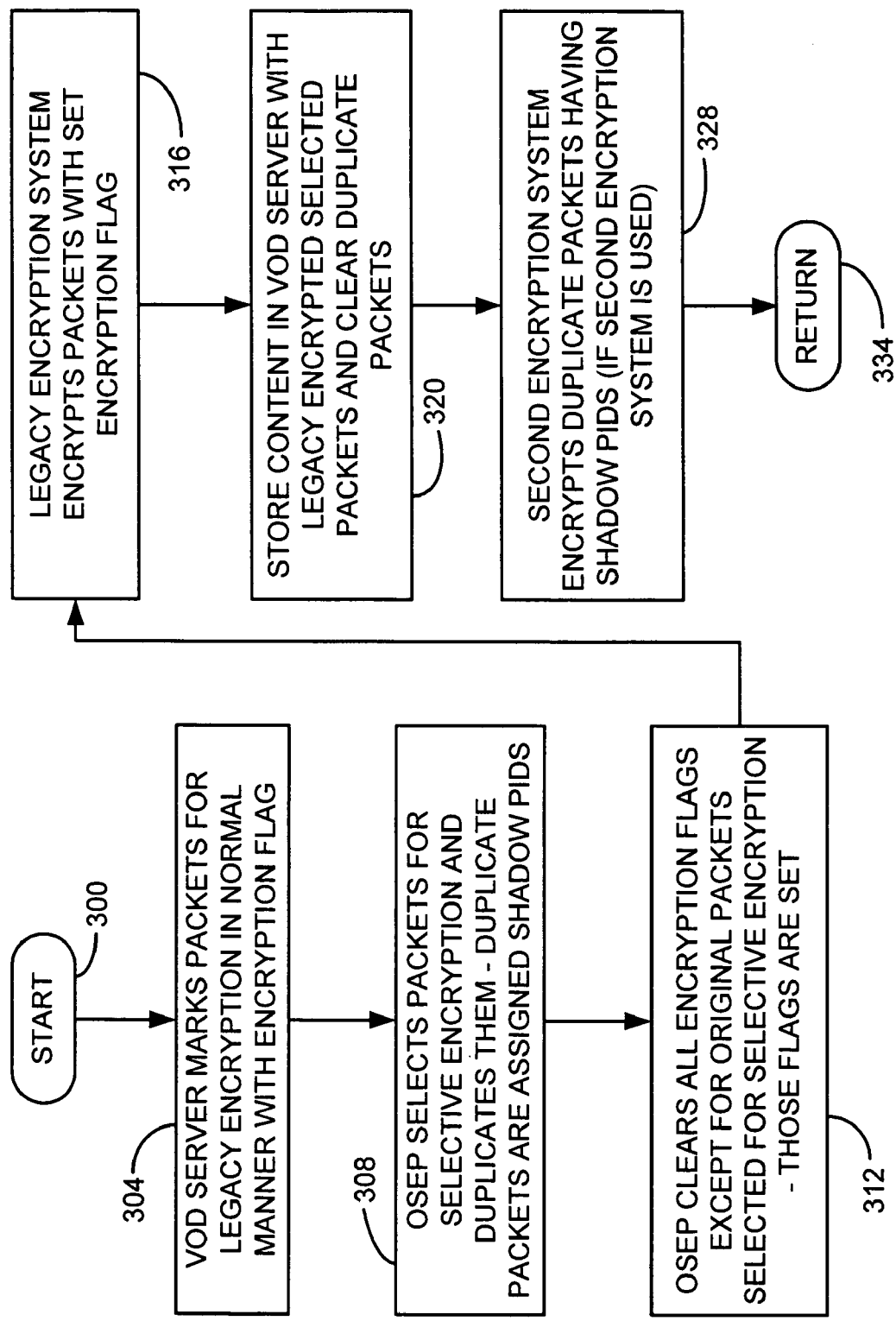
FIG. 7 is a simplified flow chart depicting one embodiment of a packet flagging operation consistent with certain embodiments of the present invention.

In order to more clearly explain the process for flagging the packets for encryption, a simplified flow chart is presented in FIG. 7, starting at 300. At 304 the VOD server marks packets in a normal manner to designate full encryption using the legacy encryption flag. This results in a collection of packets in which most of the packets are designated to be encrypted (except, for example, for those relating to timing and those used to assure a smooth transition in trick play modes). At 308, the OSEP then selects packets from this content (which is still clear and unencrypted at this point) for encryption using a selective encryption scheme, and based upon a selective encryption selection criterion. The selected packets are then duplicated and shadow PID values are assigned to the duplicate copies of packets.

At 312, the OSEP acts to assure that all encryption flags are cleared except those meeting the following criteria: 1) the packets that were selected according to the selective encryption selection criterion, and 2) the packets are those having the original set of PIDs (i.e., not the duplicated packets). The encryption flag is set for packets meeting these two criteria. At 316, the legacy encryption system (e.g., the OLES) then encrypts the packets with the set encryption flags to produce content that is selective legacy encrypted. The content still has duplicates of the encrypted packets (identified by shadow PIDS) that are unencrypted.

At 320, the content can be stored in the VOD server (or elsewhere) for later retrieval as needed to support a VOD request for the content. In this manner, if a request is from a legacy encryption compatible device, the content can be stripped of the duplicate copies and transmitted. If, however, at 328, a request is received from a device that uses the second encryption system, the legacy encrypted packets can be stripped out (or not) before transmission and the packets having shadow PIDs encrypted under the second encryption system. A third, fourth, etc. encryption system can be similarly supported by encrypting the packets having shadow PIDs on a session basis using any available encryption algorithm. The process returns at 334.

Thus, a method of processing content in a video on demand (VOD) system consistent with certain embodiments of the invention, wherein the content is identified by a first set of packet identifiers (PIDs), involves receiving content, the content having marked packets designating packets that are to be encrypted by a first encryption system by setting an encryption flag for all packets designated to be encrypted. Packets are selected in the content according to a selective encryption selection criterion to produce selected packets. The selected packets are duplicated to produce duplicate copies of the original packets and these packets are identified using a second set of PIDs. The duplicate copies of the original packets identified by the second set of PIDs are inserted into the content. All encryption flags in the content are cleared except for the selected packets having the first set of PIDs, so the encryption to follow is selective.

Figure 4:
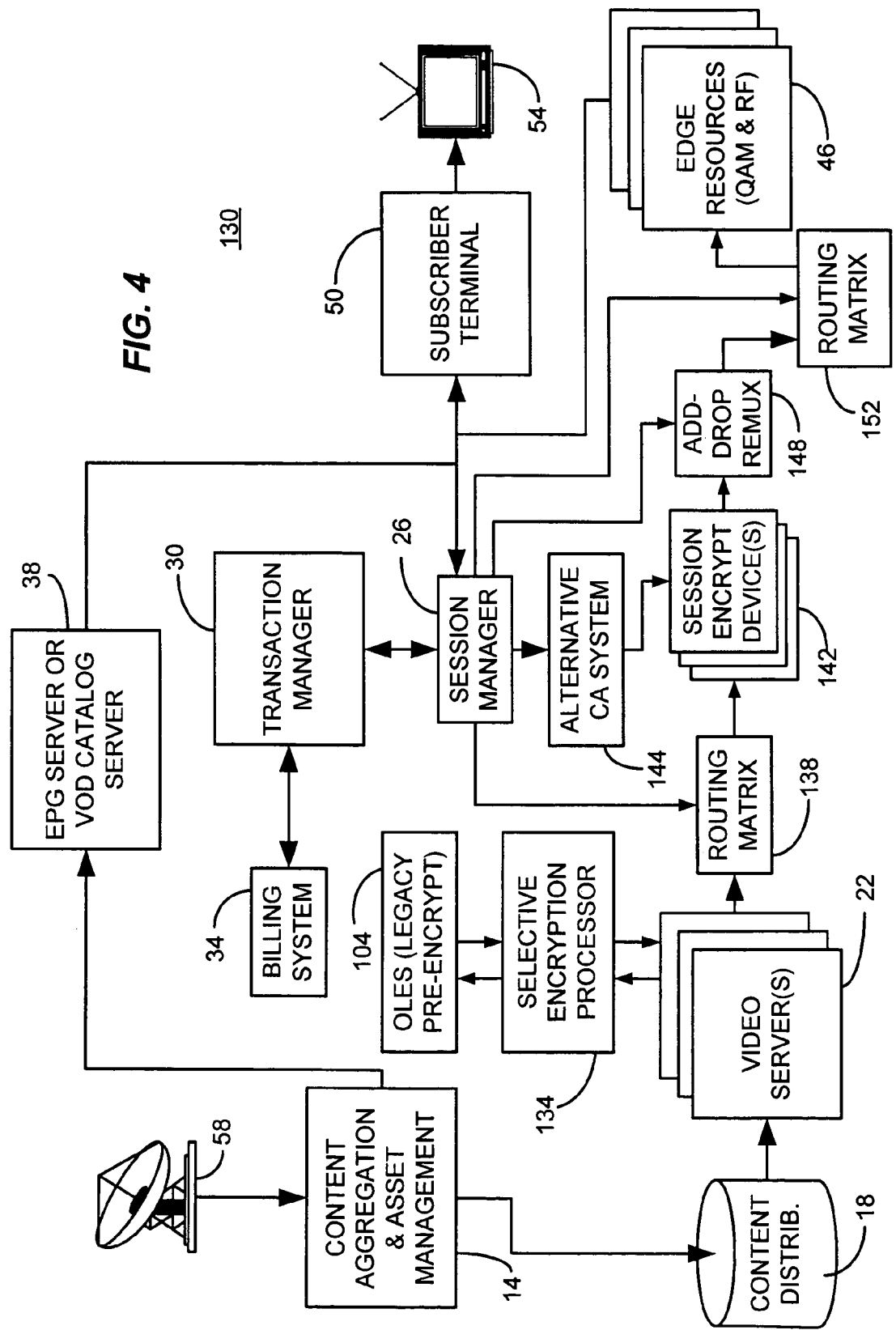
FIG. 4 is a block diagram depicting a hybrid composite VOD system architecture consistent with certain embodiments of the present invention.
Figure 8:
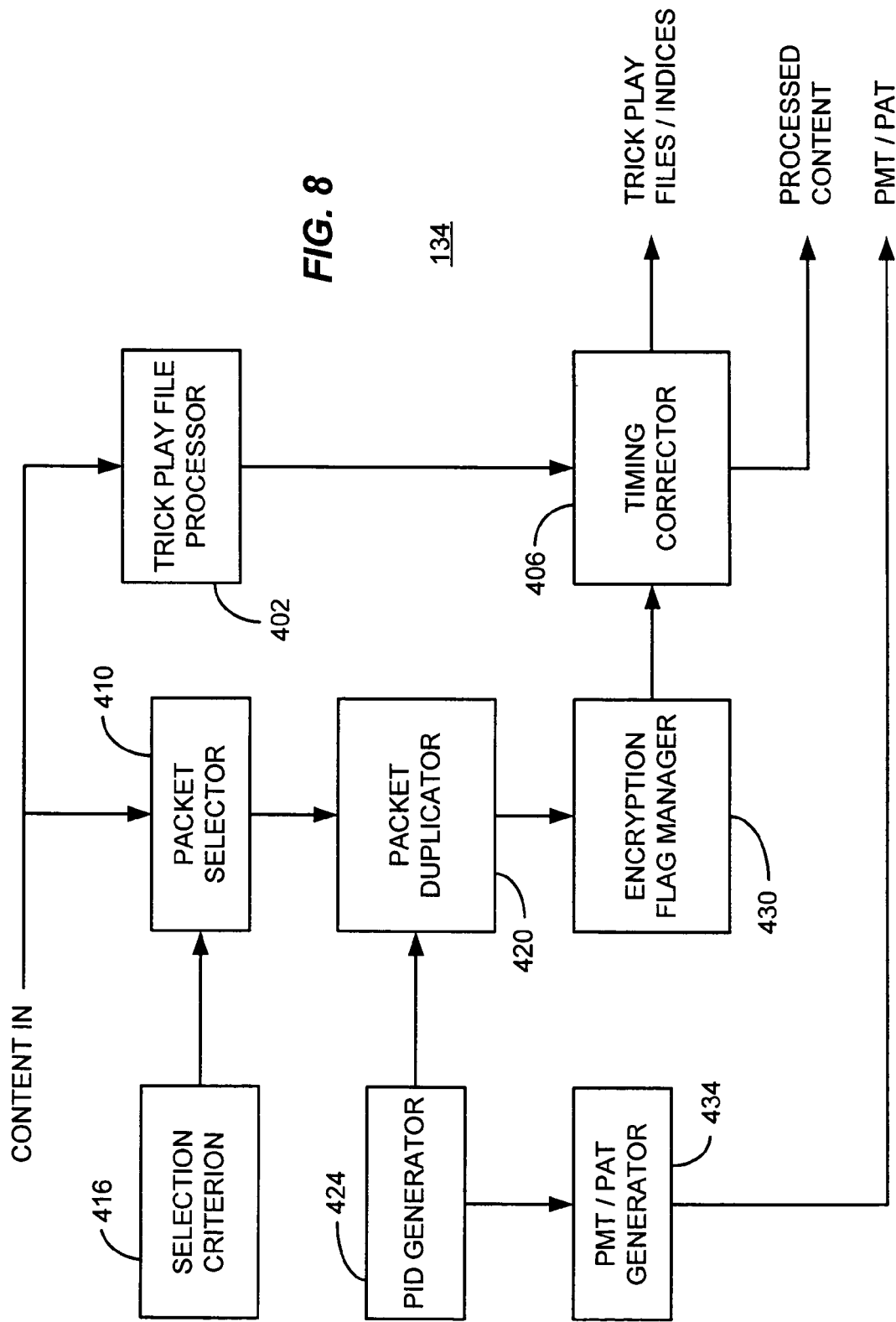
FIG. 8 is a block diagram of a selective encryption processor consistent with certain embodiments of the present invention.

One exemplary embodiment, in the form of a functional block diagram, of the selective encryption processor 134 of FIG. 4 is depicted in FIG. 8. In this embodiment, content is received by a trick play processor 402 that creates the forward and reverse trick play files and the forward and reverse trick play index tables. These tables and files are then sent to a timing corrector 406 where the timing is corrected based upon the insertion of duplicate copies of packets carried out elsewhere. The content is also provided to a packet selector 410 which selects packets for encryption based upon the selective encryption selection criterion 416.

The selected packets are duplicated at packet duplicator 420 and a PID generator 424 provides a new set of PIDs that are assigned to the duplicate copies of packets when they are inserted into the content at 420. The encryption flags are then set for all packets having original PIDs (i.e., non-duplicate packets) that were selected according to the selection criterion at encryption flag manager 430. The output of 430 is then sent to the timing corrector 406 that corrects the timing by deleting null packets and adjusting a program clock reference (PCR) in packets containing adaptation fields to account for insertion of the duplicate packets. Timing corrector 406 then supplies the processed content and trick play files and indices as output. The PID generator 424 further supplies the new PIDs used for the duplicate copies of the selected packets to a PMT/PAT generator 434 which generates new PMT and PAT tables so that the duplicate copies of the selected packets are identified in the VOD system. These new PMT and PAT tables are also supplied as an output. Of course, this functional block diagram can be implemented as processes within a programmed processor and may be rearranged in many ways without departing from embodiments consistent with the present invention.

Thus, a video on demand (VOD) system consistent with certain embodiments has a VOD server that receives content and marks packets in the content to be encrypted by a first encryption system by setting an encryption flag for all packets designated to be encrypted. A selective encryption processor processes content for storage on the VOD server, wherein the content is identified by a first set of packet identifiers (PIDs). The selective encryption processor has a packet selector that selects packets in the content according to a selective encryption selection criterion to produce selected packets. The selective encryption processor also has a packet duplicator that duplicates the selected packets to produce copies of the original packets and identifies these copies using a second set of PIDs when the duplicate packets are inserted into the content.

The selective encryption processor also has an encryption flag manager that clears all encryption flags in the content except for the selected packets having the first set of PIDs. The selective encryption processor may also have a trick play file processor that identifies packets of content used in trick play modes and creates forward and reverse trick mode content files and forward and reverse trick mode index tables. The selective encryption processor may also have a timing corrector that modifies the forward and reverse trick mode index tables to account for insertion of the duplicate copies of packets and further deletes null packets and adjusts a program clock reference (PCR) in packets containing adaptation fields to account for insertion of the duplicate copies of packets. The selective encryption processor may also have a PMT/PAT generator that generates a program association table (PAT) and a program map table (PMT) identifying the second set of PIDs.

In accordance with certain embodiments consistent with the present invention, certain of the functional blocks used to implement the VOD system can be implemented using a programmed processor such as a general purpose computer. Examples of such a functional block are the video server(s) 22 and selective encryption processor 134. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

While certain illustrative embodiments have been described, it is evident that many alternatives, modifications, permutations and variations will become apparent to those skilled in the art in light of the foregoing description.

What is claimed is:

1. A method of pre-processing content in a video on demand (VOD) system, wherein the content is identified by a first set of packet identifiers (PIDs), the method comprising:

carrying out the following process at a VOD service provider site:

receiving content, the content having marked packets designating packets that are to be encrypted by a first encryption system, the packets that are to be encrypted being marked by a set encryption flag for all packets designated to be encrypted;

selecting packets in the content according to a selective encryption selection criterion to produce selected packets;

at a packet duplicator, duplicating the selected packets to produce duplicate copies of the original packets;

identifying the duplicate copies using a second set of PIDs;

inserting the duplicate copies of the original packets identified by the second set of PIDs into the content;

clearing all encryption flags in the content except for the selected packets having the first set of PIDs, thereby producing content having identifiable duplicate selected packets suitable for selective encryption;

encrypting the content having the identifiable duplicate selected packets using the first encryption system;

storing the encrypted content having the identifiable duplicate selected packets and the duplicate copies at a VOD server for a period of time during which the VOD server awaits receipt of a request for the content from a subscriber device; and receiving the request for the stored content from a subscriber device that uses a second encryption system, and in response to the request at the VOD server:

retrieving the content from storage;

stripping out the encrypted content having the identifiable duplicate selected packets; and encrypting the duplicate copies using the second encryption system.

2. The method according to claim 1, wherein the encryption flag is encoded using transport_scrambling_control data bits.

3. The method according to claim 1, further comprising:

identifying packets of content used in trick play modes; and creating at least one trick mode content file and creating forward and reverse trick mode index tables.

4. The method according to claim 3, further comprising modifying the forward and reverse trick mode index tables to account for insertion of the duplicate copies.

5. The method according to claim 3, wherein the packets of content used in trick play modes comprise intra-coded frames.

6. The method according to claim 5, further comprising smoothing trick mode transition recovery by skipping certain packets following intra-coded frames using dynamic substitution.

7. The method according to claim 3, further comprising storing the at least one trick mode file and the forward and reverse trick mode index tables on the VOD server.

8. The method according to claim 3, further comprising generating a program association table (PAT) and a program map table (PMT) identifying the second set of PIDs.

9. The method according to claim 8, further comprising storing the at least one trick mode file and the forward and reverse trick mode index tables, the PAT, the PMT, and the content on the VOD server.

10. The method according to claim 8, wherein the packets are marked in the VOD server.

11. The method according to claim 1, further comprising generating a program association table (PAT) and a program map table (PMT) identifying the second set of PIDs.

12. The method according to claim 11, further comprising, storing the PAT, the PMT, and the content on the VOD server.

13. The method according to claim 1, wherein the encryption under the first encryption system is carried out in an off line encryption system.

14. The method according to claim 1, further comprising storing the forward and reverse trick mode files, the forward and reverse trick mode index tables, the PAT, the PMT, and the content on the VOD server.

15. The method according to claim 1, further comprising adjusting a program clock reference (PCR) in packets containing adaptation fields to account for insertion of the duplicate copies.

16. The method according to claim 1, further comprising deleting null packets to compensate for insertion of the duplicate copies.

17. The method according to claim 1, wherein the selecting, duplicating, identifying, inserting and clearing functions are carried out in an offline selective encryption processor (OSEP).

18. A method of processing content in a video on demand (VOD) system, wherein the content is identified by a first set of packet identifiers (PIDs), the method comprising:

carrying out the following process at a VOD service provider site:

identifying packets of content used in trick play modes;

creating at least one trick mode file and forward and reverse trick mode index tables;

marking packets in the content to be encrypted by a first encryption system by setting an encryption flag for all packets designated to be encrypted;

selecting packets in the content according to a selective encryption selection criterion to produce selected packets;

at a packet duplicator, duplicating the selected packets to produce duplicate copies of the selected original packets;

identifying the duplicate copies using a second set of PIDs;

generating a program association table (PAT) and a program map table (PMT) identifying the second set of PIDs;

inserting the duplicate copies identified by the second set of PIDs into the content;

clearing all encryption flags in the content except for the selected packets having the first set of PIDs, thereby producing content having identifiable duplicate selected packets suitable for selective encryption;

encrypting the content having the identifiable duplicate selected packets using the first encryption system;

storing the at least one trick mode file and the forward and reverse trick mode index tables, the PAT, the PMT, and the encrypted content having the identifiable duplicate selected packets and the duplicate copies at a VOD server for a period of time during which the VOD server awaits receipt of a request for the content from a subscriber device;

receiving the request for the stored content from a subscriber device that uses a second encryption system;

retrieving the content from storage;

stripping out the encrypted content having the identifiable duplicate selected packets in response to the request at the VOD server; and encrypting the duplicate copies using the second encryption system in response to the request.

19. The method according to claim 18, wherein the encryption flag is encoded using transport_scrambling_control data bits.

20. The method according to claim 18, wherein the encryption under the first encryption system is carried out in an off line encryption system.

21. The method according to claim 18, further comprising modifying the forward and reverse trick mode index tables, deleting null packets and adjusting a program clock reference (PCR) in packets containing adaptation fields to account for insertion of the duplicate copies prior to the storing.

22. The method according to claim 18, further comprising retrieving the encrypted content having the identifiable duplicate selected packets and the duplicate copies from the VOD server.

23. The method according to claim 18, further comprising smoothing trick mode transition recovery by skipping certain packets following intra-coded frames using dynamic substitution.

24. A selective encryption system for use in a video on demand (VOD) system, comprising:
the system residing at a VOD service provider site:
a selective encryption processor that receives content, the content containing packets that are marked for encryption by a first encryption system, the packets being marked by having a set encryption flag for all packets marked for encryption;
the selective encryption processor processing the content for storage on a VOD server, wherein the content is identified by a first set of packet identifiers (PIDs), the selective encryption processor comprising:
a packet selector that selects packets in the content according to a selective encryption selection criterion to produce selected packets;
a packet duplicator that duplicates the selected packets to produce duplicate copies of the selected packets and identifies these duplicate copies using a second set of PIDs when the duplicate copies are inserted into the content; and
an encryption flag manager that clears all encryption flags in the content except for the selected packets having the first set of PIDs; and
an off line encryption system that encrypts packets having a set encryption flag under the first encryption system;
a memory that stores the content for a period of time during which the VOD server awaits receipt of a request for the content from a subscriber device
an add/drop re-multiplexer at the service provider site that deletes the encrypted packets in response to receiving the request for the content from a target subscriber receiver that uses a second encryption system; and
a session based encrypter that encrypts the duplicate copies using the second encryption system in response to the request for the content from the target receiver that uses the second encryption system.

25. A selective encryption system for use in the video on demand system according to claim 24, wherein the encryption flag is encoded using transport_scrambling_control data bits.

26. A selective encryption system for use in the video on demand system according to claim 24, further comprising a trick play file processor that identifies packets of content used in trick play modes and creates at least one trick mode file and forward and reverse trick mode index tables.

27. A selective encryption system for use in the video on demand system according to claim 26, further comprising a timing corrector that modifies the forward and reverse trick mode index tables to account for insertion of the duplicate copies.

28. A selective encryption system for use in the video on demand according to claim 27, wherein the timing corrector further deletes null packets and adjusts a program clock reference (PCR) in packets containing adaptation fields to account for insertion of the duplicate copies.

29. A selective encryption system for use in the video on demand system according to claim 26, where the trick play file processor smoothes trick mode transition recovery by skipping certain packets following intra-coded frames using dynamic substitution.

30. A selective encryption system for use in the video on demand system according to claim 24, further comprising a PMT/PAT generator that generates a program association table (PAT) and a program map table (PMT) identifying the second set of PIDs.

31. A selective encryption system for use in the video on demand system according to claim 24, where the add/drop re-multiplexer is further configured to delete either the selected packets or the duplicate copies depending upon a target receiver's decryption capability.

32. A selective encryption system for use in the video on demand system according to claim 24, further comprising:
a trick play file processor that identifies packets of content used in trick play modes and creates at least one trick mode file and forward and reverse trick mode index tables;
a PMT/PAT generator that generates a program association table (PAT) and a program map table (PMT) identifying the second set of PIDs; and
a VOD server that stores the at least one trick mode file, the forward and reverse trick mode index tables, the PAT, the PMT, and the content.

* * * * *

UNITED STATES PATENT AND TRADEMARK OFFICE
CERTIFICATE OF CORRECTION

PATENT NO. : 7,620,180 B2
APPLICATION NO. : 10/802008
DATED : November 17, 2009
INVENTOR(S) : Pedlow, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1396 days.

Signed and Sealed this

Twenty-sixth Day of October, 2010

David J. Kappos
*Director of the United States Patent and Trademark Office*